United States Patent [19]
Flynn et al.

[11] Patent Number: 6,052,708
[45] Date of Patent: *Apr. 18, 2000

[54] PERFORMANCE MONITORING OF THREAD SWITCH EVENTS IN A MULTITHREADED PROCESSOR

[75] Inventors: William Thomas Flynn; Jack Chris Randolph, both of Rochester, Minn.; Troy Dale Larsen, North Ogden, Utah

[73] Assignee: International Business Machines Corporation, Armonk, N.Y.

[*] Notice: This patent is subject to a terminal disclaimer.

[21] Appl. No.: 08/955,404

[22] Filed: Oct. 23, 1997

Related U.S. Application Data

[63] Continuation-in-part of application No. 08/814,390, Mar. 11, 1997.

[51] Int. Cl.$^7$ .................................................. G06F 9/00
[52] U.S. Cl. ............................................................ 709/108
[58] Field of Search ................................. 709/100, 104, 709/108, 102; 714/47

[56] References Cited

U.S. PATENT DOCUMENTS

| | | | |
|---|---|---|---|
| 5,717,926 | 2/1998 | Browning et al. | 709/104 |
| 5,835,705 | 11/1998 | Larsen et al. | 714/47 |
| 5,907,702 | 5/1999 | Flynn et al. | 709/108 |
| 5,933,627 | 8/1999 | Parady . | |

OTHER PUBLICATIONS

U.S. application Ser. No. 08/957,002, "Thread Switch Control in a Multithreaded Processor Systems", filed Oct. 23, 1997.

U.S. application Ser. No. 08/958,716, "Method and Apparatus for Selecting Thread Switch Events in a Multithreaded Processor", filed Oct. 23, 1997.

U.S. application Ser. No. 08/956,875, "An Apparatus and Method to Guarantee Forward Progress in a Multithreaded Processor", filed Oct. 23, 1997.

U.S. application Ser. No. 08/958,718, "Altering Thread Priorities in a Multithreaded Processor", filed Oct. 23, 1997.

U.S. application Ser. No. 08/956,577, "Method and Apparatus to Force a Thread Switch in a Multithreaded Processor", filed Oct. 23, 1997.

*Primary Examiner*—Majid A. Banankhah
*Attorney, Agent, or Firm*—Brian R. Russell; Andrew J. Dillon

[57] ABSTRACT

A multithreaded processor and a method for performance monitoring within a multithreaded processor are described. According to the present invention, execution circuitry within the multithreaded processor executes instructions in an active thread among first and second concurrent threads, while buffering circuitry buffers instructions and/or data of an inactive one of the first and second concurrent threads. Thread switch logic in the multithreaded processor switches threads by activating the inactive thread and inactivating the active thread. The operation of the multithreaded processor is monitored by a performance monitor, which records occurrences of an event generated by switching threads.

23 Claims, 6 Drawing Sheets

PERFORMANCE MONITORING OF THREAD SWITCH EVENTS IN A MULTITHREADED PROCESSOR

This application is a continuation-in-part of prior co-pending application Ser. No. 08/814,390, filed Mar. 11, 1997, and entitled "Method and System for Performance Monitoring in a Multithreaded Processor" by Troy D. Larsen, Jack C. Randolph, and Andrew H. Wottreng.

CROSS-REFERENCE TO RELATED APPLICATIONS

The subject matter of this application is related to the subject matter of the following prior co-pending applications, each of which is incorporated herein by reference.

(1) application Ser. No. 08/957,002 (Docket No. RO9-96-042), filed October, 1997, and entitled "Thread Switch Control in a Multithreaded Processor System".

(2) application Ser. No. 08/958,716 (Docket No. RO9-97-104), filed October, 1997, and entitled "Apparatus for Selecting Thread Switch Events in a Multithreaded Processor".

(3) application Ser. No. 08/956,875 (Docket No. RO9-97-105), filed October, 1997, and entitled "An Apparatus to Guarantee Forward Progress in a Multithreaded Processor".

(4) application Ser. No. 08/958,718 (Docket No. RO9-97-106), filed October, 1997, and entitled "Altering Thread Priorities in a Multithreaded Processor".

(5) application Ser. No. 08/956,577 (Docket No. RO9-97-107), filed October, 1997, and entitled "Method and Apparatus to Force a Thread Switch in a Multithreaded Processor".

BACKGROUND OF THE INVENTION

1. Technical Field

The present invention relates in general to data processing and in particular to performance monitoring within a data processing system. Still more particularly, the present invention relates to performance monitoring within a multi-threaded processor.

2. Description of the Related Art

In order to extract optimum performance from a processor, hardware and software engineers detect and analyze the processor's dynamic behavior. In the past, most of the processor states useful in such processor analysis were accessible to external instrumentation. For example, at low levels of integration, most machines states, bus transactions, and other useful signals were detectable on module interconnects, edge connectors, and chip backplanes. Thus, data could be easily captured and post-processed for use in processor performance analysis.

However, as the level of integration has increased, thereby rendering processor states inaccessible to external instrumentation, it has become necessary to integrate performance monitoring circuitry within the processor in order to capture the empirical data required to optimize both hardware and software. Such on-board performance monitors typically include one or more counters that each count occurrences of a selected event indicative of processor performance, such as processor cycles, instructions executed, or cache misses. While currently available performance monitors may provide adequate data to analyze the dynamic behavior of conventional processors, a conventional performance monitor that utilizes a single counter to record all occurrences of a selected event cannot provide sufficiently detailed performance data for a multithreaded processor that provides hardware support for multiple concurrent threads. For example, a conventional performance monitor cannot provide information indicating the number of cache misses attributable to each thread, the number of processor cycles utilized by each thread, or how often and why thread switches are occurring.

Consequently, it would be desirable to provide an improved performance monitor for a multithreaded processor that is capable of independently monitoring events generated by each of a plurality of threads and, in particular, is capable of monitoring thread switch events.

SUMMARY OF THE INVENTION

It is therefore one object of the present invention to provide an improved method and system for data processing.

It is another object of the present invention to provide an improved method and system for performance monitoring in a data processing system.

It is yet another object of the present invention to provide an improved method and system for performance monitoring within a multithreaded processor.

The foregoing objects are achieved as is now described. A multithreaded processor and a method for performance monitoring within a multithreaded processor are provided. According to the present invention, execution circuitry within the multithreaded processor executes instructions in an active thread among first and second concurrent threads, while buffering circuitry buffers instructions and/or data of an inactive one of the first and second concurrent threads. Thread switch logic in the multithreaded processor switches threads by activating the inactive thread and inactivating the active thread. The operation of the multithreaded processor is monitored by a performance monitor, which records occurrences of an event generated by switching threads.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
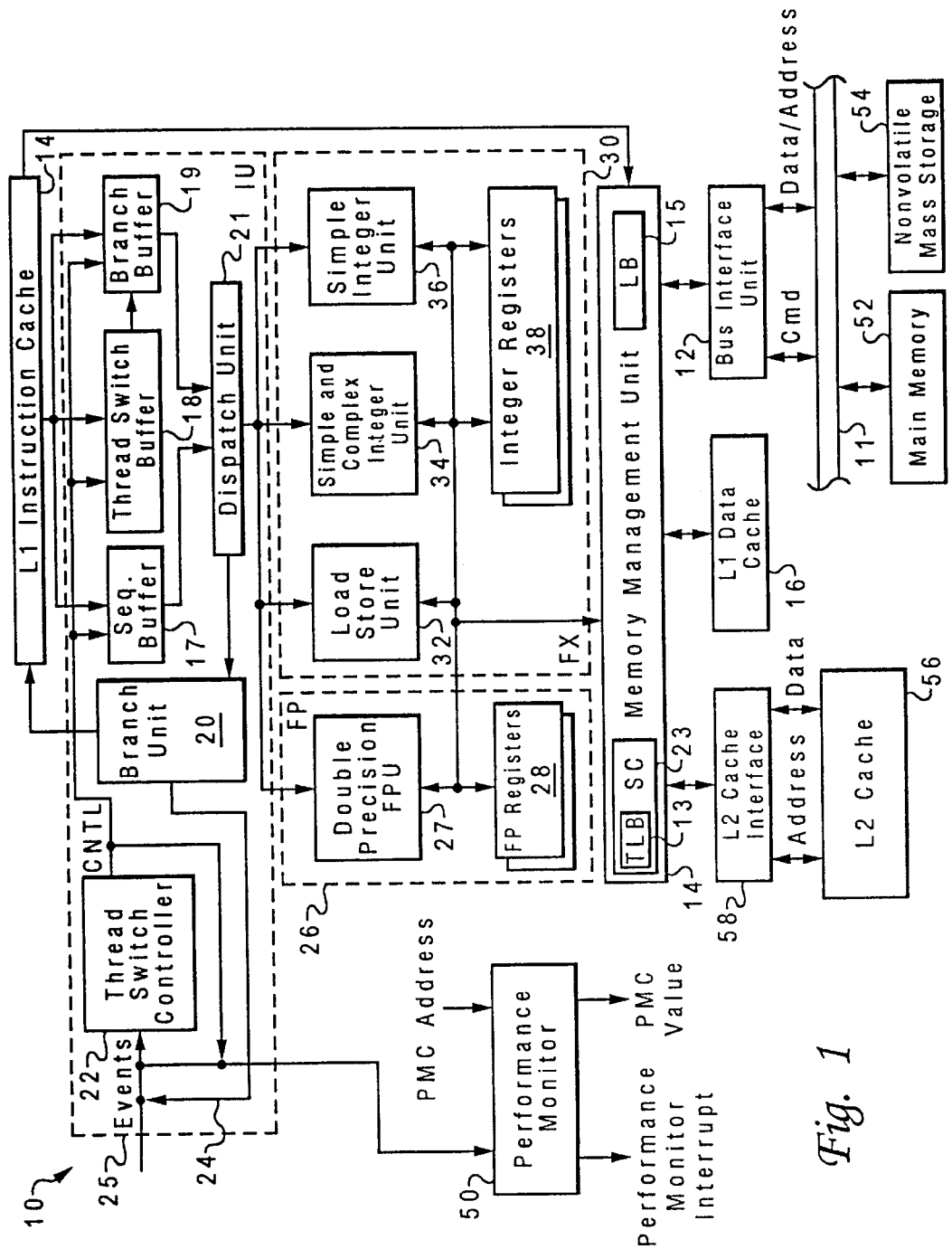
FIG. 1 is a block diagram depiction of an illustrative embodiment of a multithreaded data processing system that includes a performance monitor in accordance with the present invention.

With reference now to the figures and in particular with reference to FIG. 1, there is depicted a block diagram of an illustrative embodiment of a multithreaded data processing system in accordance with the invention recited within the appended claims. In the depicted illustrative embodiment, processor 10, which includes both data processing circuitry and an on-board performance monitor 50, comprises a single integrated circuit superscalar microprocessor. Thus, as discussed further below, the various execution units, registers, buffers, memories, and other functional units of processor 10 are all formed by integrated circuitry. Processor 10 preferably comprises one of the line of reduced instruction set computing (RISC) processors available from International Business Machines; however, those skilled in the art will appreciate from the following description that other suitable processors can alternatively be utilized to implement the present invention.

As illustrated in FIG. 1, processor 10 is coupled to system bus 11 via bus interface unit (BIU) 12, which controls the transfer of information between processor 10 and other devices coupled to system bus 11, such as main memory 52 and nonvolatile mass storage 54, by participating in bus arbitration. The data processing system illustrated in FIG. 1 preferably includes other unillustrated devices coupled to system bus 11, which are not necessary for an understanding of the following description and are accordingly omitted for the sake of simplicity.

BIU 12 is connected to memory management unit (MMU) 14, which manages access by processor 10 to data and instructions stored within the various components of the memory hierarchy of processor 10. In the illustrative embodiment, the memory hierarchy of processor 10 includes not only nonvolatile mass storage 54 and main memory 52, but also a unified level two (L2) cache 56, which is accessed through L2 cache interface 58, a level one (L1) instruction cache 14, and a L1 data cache 16. Thus, the management functions of MMU 14 include, for example, performing logical-to-real address translation utilizing Translation Lookaside Buffer (TLB) 13, accessing data within L1 data cache 16 and L2 cache 56 utilizing storage control (SC) circuitry 23, and transferring lines of data between line buffer (LB) 15 and BIU 12. As is understood by those skilled in the art, staging data and instructions within progressively higher speed memory in this manner enables processor 10 to achieve relatively fast access to data and instructions stored within the higher levels of the memory hierarchy, thus improving the overall performance of the data processing system.

L1 instruction cache 14 is further coupled to sequential buffer 17, thread switch buffer 18, branch buffer 19, and branch unit 20, which together with dispatch unit 21 and thread switch controller 22 form the instruction unit (IU) logical partition 25 of processor 10. IU 25 controls the execution of one of the multiple possible concurrent hardware threads within the floating point (FP) logical partition 26 and fixed point (FX) logical partition 30 of processor 10. In the present disclosure, the term "hardware thread" or simply "thread" is utilized to describe a group of instructions (that may or may not belong to the same program as other concurrent threads) whose state (e.g., control and data register values) can be simultaneously maintained in processor hardware with that of one or more other hardware threads and whose execution is governed by processor hardware. Thus, it should be apparent to those skilled in the art that the fine-grained multithreading supported by processor 10 is distinct from the software-managed coarse-grained multitasking supported by many state-of-the-art operating systems. Furthermore, it should be understood that although processor 10 will hereafter be described as supporting only two concurrent threads (i.e., one active and one inactive), the present invention is equally applicable to multithreaded processors that support additional active and inactive threads.

During operation, thread switch controller 22 selects one of the two concurrent threads as the active thread. Sequential buffer 17 then fetches instructions within the active thread from L1 instruction cache 14 and temporarily buffers the instructions. Under the control of thread switch controller 22, sequential buffer 17 passes fetched instructions to dispatch unit 21 in order of receipt. Dispatch unit 21 partially decodes each instruction, thereafter transmitting branch instructions to branch unit 20 and sequential instructions to the appropriate one of FP 26 and FX 30 for execution. In response to receipt of a branch instruction, branch unit 20 determines the target address at which execution will continue if the branch is taken and supplies the target address to L1 instruction cache 14. While still supplying instructions in the sequential execution path to sequential buffer 17, L1 instruction cache 14 responds to the target address received from branch unit 20 by loading branch buffer 19 with instructions within the target execution path. If branch unit 20 subsequently resolves the branch as taken, for example, by examining the contents of a condition register, branch unit 20 asserts signal line 24. In response to the assertion of signal line 24, thread switch controller 22 directs branch buffer 19 to supply instructions in the target execution path to dispatch unit 21, which is then able to dispatch instructions within the target execution path. While dispatch unit 21 is dispatching previously fetched instructions out of branch buffer 19, sequential buffer 17 begins to fetch instructions within the new (i.e., target) execution path.

IU 25 performs thread switches in a similar manner. While the active thread is being executed, thread switch buffer 18 fetches and buffers the next instructions to be executed within the inactive thread. In addition, thread switch controller 22 receives event occurrences from throughout processor 10 as described in greater detail below. In response to an occurrence of a selected event, for example, an L2 cache miss or TLB miss for the active thread, thread switch controller 22 designates the inactive thread as the active thread and directs thread switch buffer 18 to transfer its instructions to branch buffer 19. Under the control of thread switch controller 22, dispatch unit 21 then begins to dispatch instructions in the newly activated thread from branch buffer 19 to branch unit 20, FP 26, and FX 30. Meanwhile, sequential buffer 17 begins to fetch instructions within the newly activated thread and thread switch buffer 18 begins to fetch instructions within the newly inactivated thread.

Referring now to FP 26 and FX 30, in addition to branch unit 20 the execution circuitry of processor 10 includes double-precision floating-point unit (FPU) 27, load/store unit (LSU) 32, simple and complex integer unit 34, and simple integer unit 36. Each of execution units 27, 32, 34, and 36 is capable of executing one or more instructions of one or more associated types of sequential instructions during each processor cycle. For example, simple integer unit 36 performs fixed-point mathematical operations (e.g., addition and subtraction) and compare operations utilizing source operands loaded from specified integer registers 38. Following the execution of a fixed-point instruction, simple integer unit 36 stores the result data of the instruction in one or more specified integer registers 38. Similarly, double-precision FPU 27 performs double-precision floating-point arithmetic and logical operations, such as floating-point multiplication and division, on source operands loaded from floating-point registers (FPRs) 28 and stores result data within specified FPRs 28. Each of the sequential instruction execution units of processor 10 employs both pipelining to further improve the performance of the superscalar architecture of processor 10. As illustrated, each of FPRs 28 and integer registers 38 has multiple duplicate register sets or "ways", which are each associated with a respective one of the multiple concurrent threads supported by processor 10.

According to the present invention, processor 10 includes a performance monitor 50, which as described in detail below, supports independent performance monitoring for each of the multiple concurrent threads supported by processor 10. As illustrated, performance monitor 50, like thread switch controller 22, receives as inputs event occurrences generated by the operation of IU 25, FP 26, FX 30, SC 23, BIU 12, and L2 cache interface 58. Selected event occurrences among the numerous diverse event occurrences that may be received by performance monitor 50 are recorded within software-readable and writable performance monitor counters (PMCs) within performance monitor 50. In response to the execution of an architecturally-defined instruction that specifies a PMC "address", performance monitor 50 outputs the value of the specified PMC, for example, by storing the value of the specified PMC within a selected one of integer registers 38. Performance monitor 50 also has a performance monitor interrupt output that is asserted in response to an overflow of one of the PMCs.

In accordance with an important aspect of the present invention, performance monitor 50 has two modes of operation: (1) a global mode in which all occurrences of the same event are recorded together whether or not the occurrences are all generated in response to the processing of the same thread and (2) a multithread mode in which occurrences of events associated with each thread are recorded separately.

Figure 2:
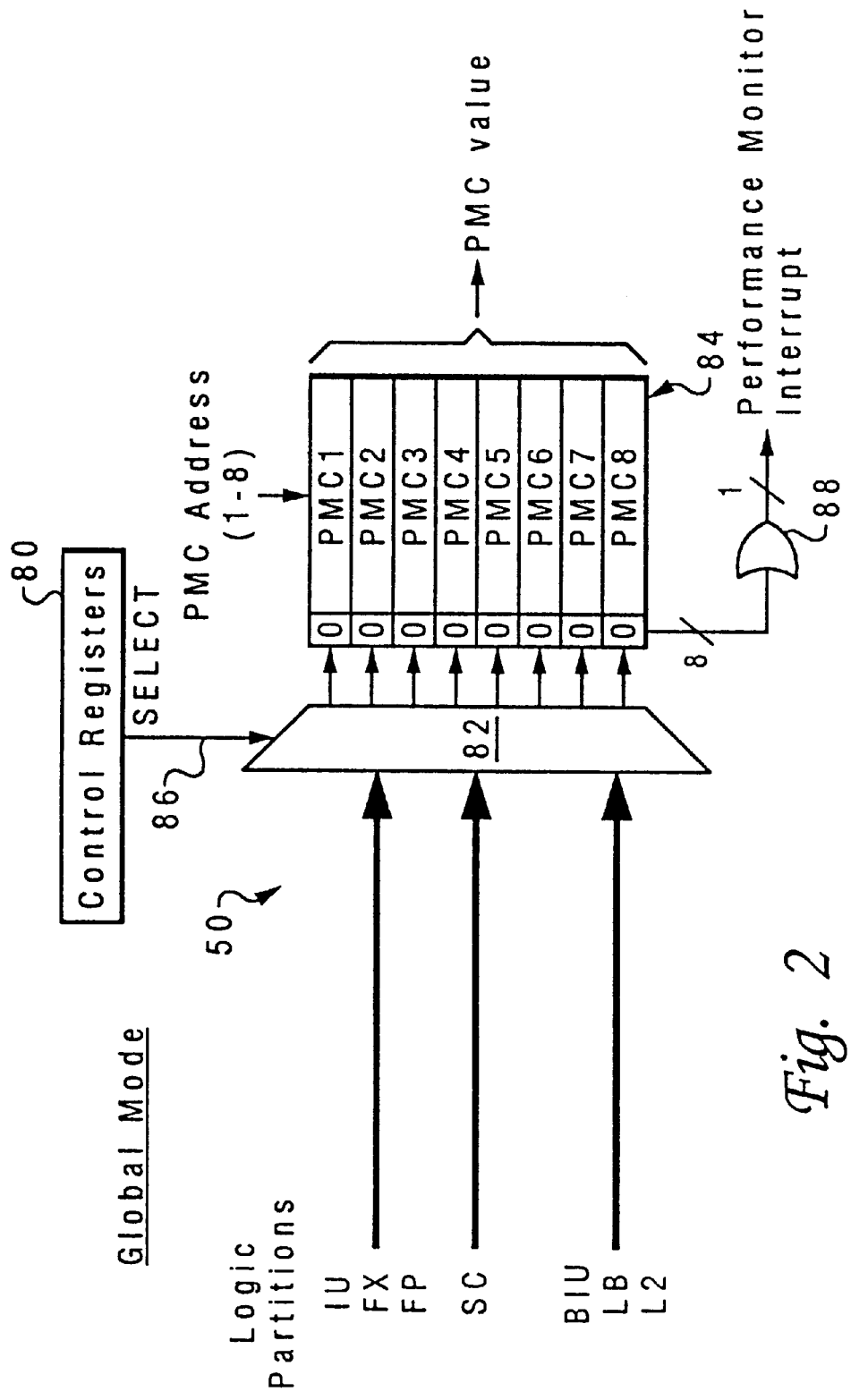
FIG. 2 is a representation of the performance monitor depicted in FIG. 1 when the performance monitor is operating in global mode.

Referring now to FIG. 2, there is depicted a conceptual diagram of performance monitor 50 when operating in global mode. As illustrated, in global mode the event occurrences generated by all of the logical partitions of processor 10 are input into multiplexer 82. Multiplexer 82 then routes the event occurrences to particular counters among PMCs 84 in response to select input 86, which is generated in response to the settings of bit fields within software-accessible control registers 80. The bit fields within control registers 80 specify not only the event occurrences, if any, each of PMCs 84 records, but also the mode in which performance monitor 50 operates (i.e., global or multithread) and when counting is enabled and disabled for each of PMCs 84. In response to receipt of an associated event occurrence, an enabled PMC increments. As depicted in FIG. 2, if bit 0 of any of PMCs 84 is set to 1, a performance monitor interrupt is generated by OR gate 88.

Figure 3:
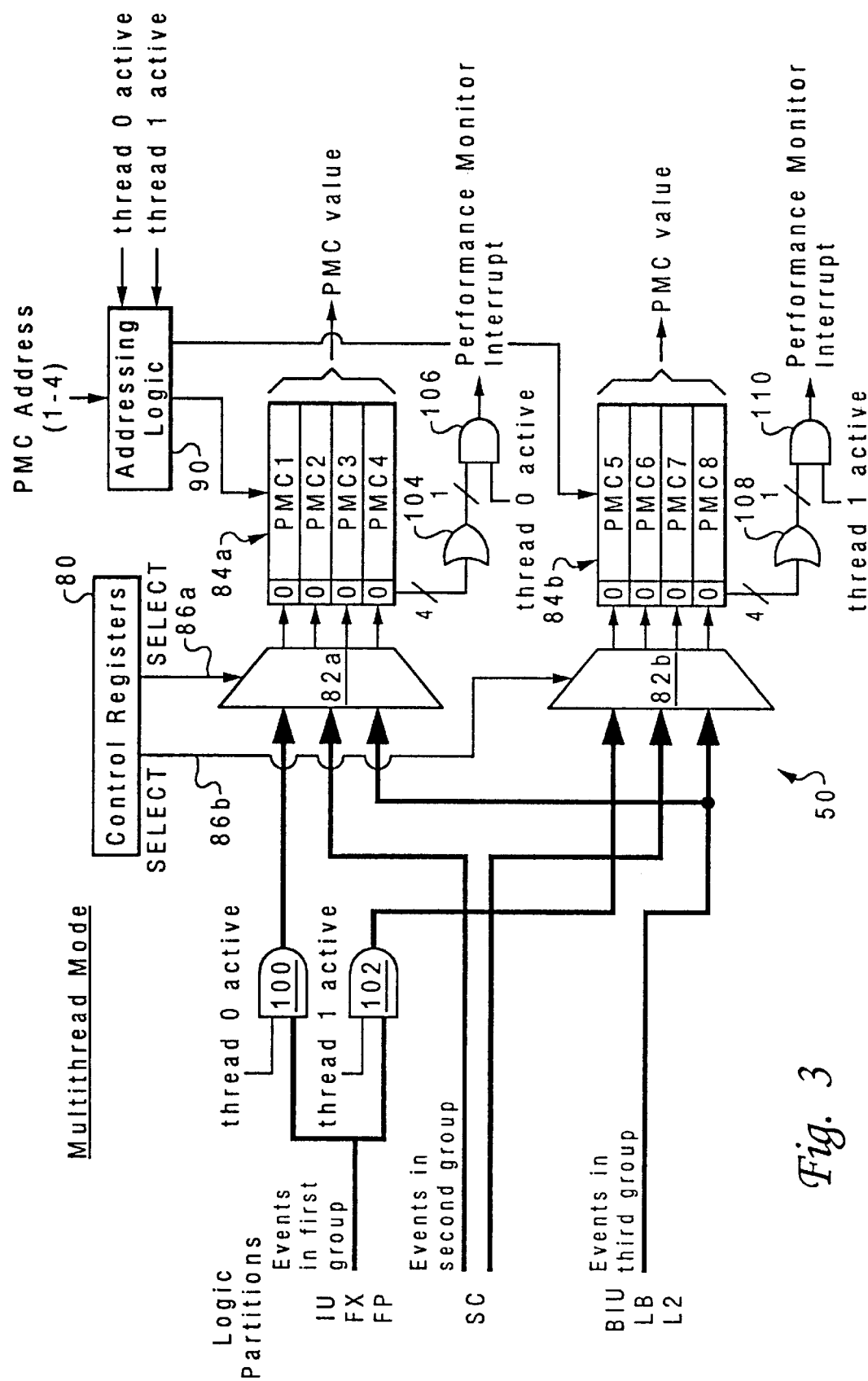
FIG. 3 is a representation of the performance monitor depicted in FIG. 1 when the performance monitor is operating in multithread mode.

With reference now to FIG. 3, there is illustrated a conceptual view of performance monitor 50 when operating in multithread mode. In the depicted illustrative embodiment, processor 10 supports a maximum of two concurrent threads, which are each allocated half of PMCs 84. Thus, PMC1–PMC4, which are identified with reference numeral 84a, are allocated to thread 0 and PMC5–PMC8, which are identified with reference numeral 84b, are allocated to thread 1. As illustrated, event occurrences are routed to PMC1–PMC4 by multiplexer 82a in response to select input 86a, and event occurrences are routed to PMC5–PMC8 by multiplexer 82b in response to select input 86b. Select inputs 86a and 86b are generated in response to the value of bit fields within control registers 80 in the manner described above with reference to FIG. 2.

In contrast to the operation of performance monitor 50 in global mode, when performance monitor 50 is operating in multithread mode event occurrences are not all handled alike. Instead, an event occurrence is handled in a manner dependent upon the event group to which the event occurrence belongs. The first group of events include those events associated with or counted by the active thread. Occurrences of these events can be generated by IU 25, FX 30, and FP 26 and include the following:

(1) instructions completed
(2) processor cycles
(3) cycles of storage latency
(4) branch data
(5) data dependencies
(6) unaligned accesses
(7) L1 instruction cache miss count
(8) floating-point operations
(9) thread switch counts—switches of currently active thread to become the inactive thread
(10) thread switch cycles—processor cycles between signalling of a thread switch by thread switch controller 22 and execution of first instruction in the currently active thread
(11) number of processor cycles that the inactive thread was available for execution prior to a thread switch
(12) number of processor cycles that processor executed in single-thread mode (i.e., multithreading was disabled)
(13) number of processor cycles that both the active and the inactive thread did not include instructions within wait state task—this count provides a measure of software utilization of the multithreaded capabilities of the processor
(14) thread switch buffer empty on thread switch
(15) thrashing count—thread switches after less than a predetermined number of instructions have been executed in the active thread
(16) number of thread switches caused by a specified event Support for the thrashing count (i.e., item (15) in the first event group) can be implemented within performance monitor 50 in a number of ways. For example, performance monitor 50 can be equipped with a dedicated N-bit thrash counter that, in response to a thread switch, is set to a value equal to the predetermined number of instructions. As instructions are executed in the active thread, the thrash counter is decremented once for each executed instruction. If the thrash counter has a non-zero value when the next thread switch occurs and the thrash count event is enabled, a selected one of the PMCs is incremented to indicate that processor 10 is thrashing between threads. In an alternative embodiment, one of the PMCs can be utilized to count the number of instructions executed between thread switches.

With respect to item (16) in the third group of events, it should be understood that thread switch controller 22 can be configured to initiate a thread switch in response to an occurrence of any one or a combination of the events it receives. Events of particular utility include the following:

(a) L1 data load miss—a load misses in L1 Data cache 16 and the inactive thread is not waiting for L2 miss data or an address translation in progress.

(b) L1 data store miss—a store misses in L1 Data cache 16 and the inactive thread is not waiting for L2 miss data or an address translation in progress.

(c) L1 instruction miss—an instruction fetch misses in L1 instruction cache 14 and the inactive thread is not waiting for L2 miss data or an address translation in progress. Speculative instruction fetch misses do not cause thread switches.

(d) Instruction effective-to-real address translation (ERAT) miss—instruction ERAT miss and the inactive thread is not waiting for L2 miss data. Thread switch occurs on an instruction ERAT miss only if it is known the instruction is needed; speculative instruction fetches do not cause thread switches.

(e) translation lookaside buffer (TLB)/segment lookaside buffer (SLB) miss—TLB/SLB miss independent of whether or not the inactive thread is waiting for L2 miss data or an address translation in progress.

(f) L2 miss and inactive thread not waiting on L2 miss—the active thread is not executing instructions but has an L2 cache miss from a previous attempt to execute an instruction and the inactive thread is not waiting on an L2 cache miss.

(g) L2 load miss—L2 cache miss on a load independent of whether or not the inactive thread is also waiting for L2 miss data or an address translation in progress.

(h) L2 store miss—L2 cache miss on a store independent of whether or not the inactive thread is also waiting for L2 miss data or an address translation in progress.

(i) L2 instruction miss—L2 cache miss on an instruction fetch. A thread switch occurs on an L2 cache miss if it is known the instruction is needed; speculative instruction fetches do not cause thread switches.

(j) thread switch timeout value reached—thread switch timeout value reached and the other thread is ready (e.g., no outstanding cache miss). The thread switch timeout value is software programmable by writing to the thread switch timeout register.

(k) diagnostic command—a command by a service processor incorporated within processor 10 forces a thread switch.

(l) store double: miss on first word—cache miss on the first word of a double word store. A thread switch occurs and the store is performed in the background. When returning to the thread containing the store double, the next valid instruction is executed.

(m) store double: miss on second word—cache miss on the second word of a double word store. A thread switch occurs and the store is performed in the background. When returning to the thread containing the store double, the next valid instruction is executed.

(n) store multiple/string—L1 cache miss on any part of a store multiple or store string. Because it has only been partially executed, the entire store multiple or store string instruction is re-executed after returning to the thread.

(o) load multiple/string—L1 cache miss on any part of a load multiple or load string. Because it has only been partially executed, the entire load multiple or load string instruction is re-executed after returning to the thread.

(p) unaligned load: miss on first of two—L1 cache miss for first half of load that crosses a double word boundary. The load is performed in the background, and after returning to the thread, the next valid instruction is executed.

(q) unaligned load: miss on second of two—L1 cache miss for second half of load that crosses a double word boundary. The load is performed in the background, and after returning to the thread, the next valid instruction is executed.

(r) inactive thread data storage interrupt (DSI)—inactive thread receives a DSI (s) L2 data returned to inactive thread—while waiting on L2 miss data for both threads, the inactive thread's L2 miss data is returned first.

(t) active thread disabled (e.g., by a breakpoint set by the service processor)

(u) software thread switch—special noop instruction (OR 1,1,1) is executed that prompts a thread switch.

(v) priority—inactive thread is assigned a higher priority than the active thread and the inactive thread is not stalled.

(w) L2 miss on a multi-cycle load (x) L2 miss on multi-cycle store (y) TLB miss on multi-cycle instruction The second group of events comprise those that may be associated with either the active thread or the inactive thread. Occurrences of these events can be generated by SC 23 and include the following:

(1) L1 data cache miss events, such as total count, latencies, miss types, etc.

(2) translation miss event (e.g., TLB miss events)

(3) L2 cache miss events

The third group of events comprise those that are not associated with a particular thread. Occurrences of these events can be generated by BIU 12, LB 15, or L2 cache interface 58 and include:

(1) L2 cache line transitions (2) L2 cache castouts (3) L2 cache snoop counts (4) line buffer usage (5) system bus utilization (6) system bus retries Referring again to FIG. 3, event occurrences in the first event group are received as inputs by AND gates 100 and 102. Event occurrences within the first event group are input to multiplexer 82*a* only if thread 0 is active and are input to multiplexer 82*b* only if thread 1 is active. In contrast to event occurrences belonging to the first event group, events within the second group are passed to the appropriate one of the multiplexers 82*a* and 82*b* for possible selection regardless of whether the thread associated with the event occurrence is the active or inactive thread. Event occurrences belonging to the third event group are passed to both of multiplexers 82*a* and 82*b* for possible selection.

Figure 4:
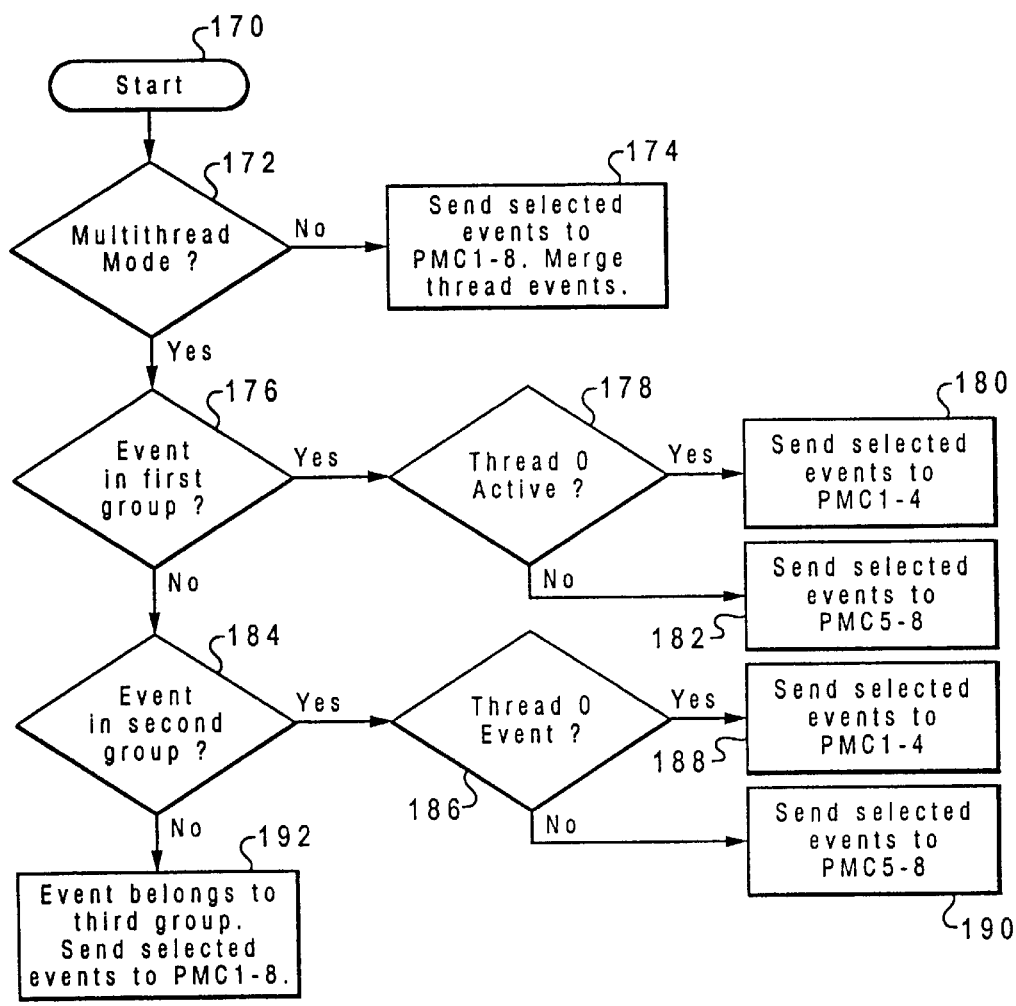
FIG. 4 is a logical flowchart depicting how events are routed to the performance monitor counters when the performance monitor is operating in each of the global and multithread modes.

With reference now to FIG. 4, there is illustrated a logical flowchart that summarizes the method by which performance monitor 50 handles event occurrences for each of the global and multithread modes of operation. As depicted, the process begins at block 170 and thereafter proceeds to block 172, which illustrates a determination of whether or not performance monitor 50 is operating in multithread mode. In response to a determination that performance monitor 50 is not operating in multithread mode but is operating in global mode, the process passes to block 174, which depicts multiplexer 82 routing event occurrences selected by select input 86 to the appropriate ones of PMCs 84. As noted above, occurrences of the same event generated by different threads are merged within PMCs 84 such that a single event count is maintained for each selected event.

Referring again to block 172, in response to a determination that performance monitor 50 is operating in multithread mode, the process proceeds to block 176, which illustrates a determination of whether or not a detected event occurrence belongs to the first event group. If so, a determination is made whether or not thread 0 is the active thread, as depicted at block 178. If thread 0 is the active thread, the process proceeds to block 180, which illustrates the event occurrence, if selected, being transmitted to the appropriate one of PMC1–PMC4. However, in response to a determination that thread 1 is the active thread, the process proceeds from block 178 to block 182. Block 182 depicts the event occurrence, if selected, being transmitted to the appropriate one of PMC5–PMC8.

Returning to block 176, in response to a determination that a detected event occurrence did not belong to the first event group, the process proceeds to block 184. Block 184 depicts a determination of whether or not the event occurrence belongs to the second event group. If so, the process proceeds from block 184 to block 186, which illustrates a determination of whether or not the event occurrence was generated in response to processing thread 0 or thread 1. In response to a determination that the event occurrence was generated in response to processing thread O, the process passes to block 188, which depicts sending the event occurrence to one of PMC1–PMC4, if the event occurrence is selected. Alternatively, in response to a determination at block 186 that the event occurrence was generated in response to processing thread 1, the process passes to block 190, which illustrates sending the event occurrence to one of PMC5–PMC8, if the event occurrence is selected.

Referring again to block 184, in response to a determination that the event occurrence does not belong to the second event group, the process proceeds to block 192, which illustrates a determination that the event occurrence belongs to the third event group. In response to this determination, the event occurrence, if selected, is routed to the appropriate one of PMC1–PMC8.

Figure 5:
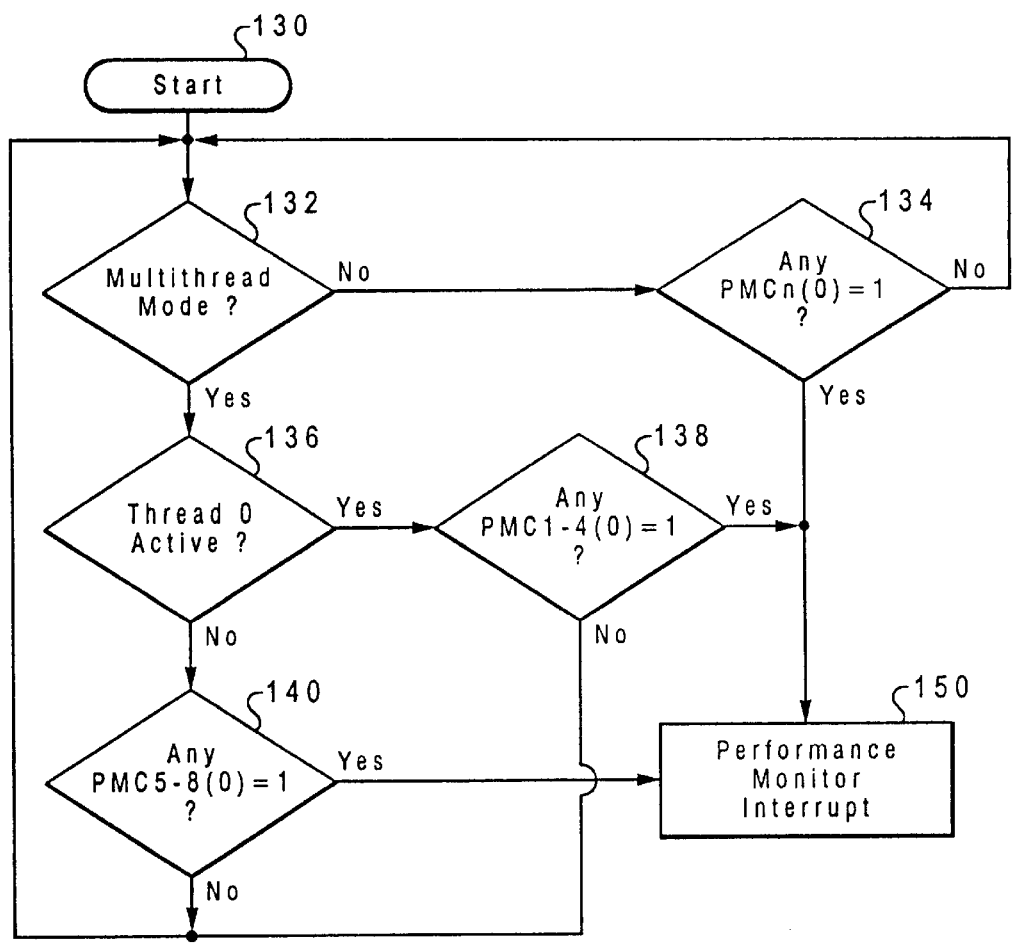
FIG. 5 is a logical flowchart illustrating how performance monitor interrupts are generated when the performance monitor is operating in each of the global and multithread modes.

Referring now to FIG. 5, there is depicted a logical flowchart that summarizes the interrupt behavior of performance monitor 50. As illustrated, the process begins at block 130 and thereafter proceeds to block 132, which illustrates a determination of whether or not performance monitor 50 is operating in multithread mode. The determination illustrated at block 132 may be made, for example, by examining the value of a predetermined bit field within control registers 80. In response to a determination that performance monitor 50 is not operating in multithread mode but is operating in global mode, the process proceeds to block 134, which depicts a determination of whether or not bit 0 of any of PMC1–PMC8 has a value of 1. If not, the process returns to block 132. However, in response to a determination that bit 0 of at least one of PMCs 84 is set to 1, a performance monitor interrupt is generated, as illustrated at block 150 of FIG. 5.

In contrast to global mode, when performance monitor 50 is operating in multithread mode only performance monitor interrupts associated with the active thread are presented to software. Thus, referring to blocks 136 and 138 of FIG. 5, if thread 0 is active, only performance monitor interrupts associated with PMCs 84a are presented; interrupts associated with PMCs 84b are saved until thread 1 is again active. Alternatively, as illustrated at blocks 140 and 150, if thread 1 is active performance monitor interrupts associated with PMCs 84b are presented to software, while interrupts associated with PMCs 84a are saved until thread O is again active. In FIG. 3, this interrupt behavior is implemented by OR gates 104 and 108 and AND gates 106 and 110.

Figure 6:
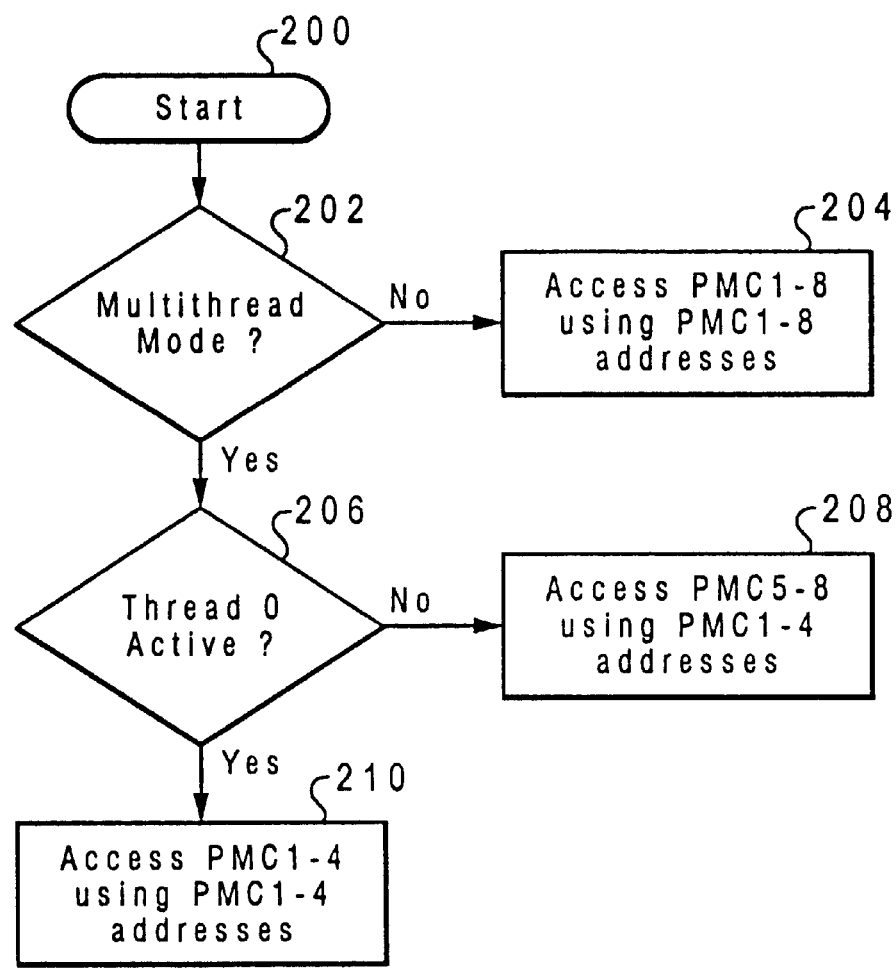
FIG. 6 is a logical flowchart illustrating how the performance monitor counters are accessed when the performance monitor is operating in each of the global and multithread modes.

Referring now to FIG. 6, there is depicted a logical flowchart summarizing the method by which PMC1–PMC8 within performance monitor 50 are accessed. As illustrated, the process begins at block 200 in response to LSU 32 receiving an instruction from dispatch unit 21 that specifies a particular PMC to be read or written. In response to the instruction, LSU 32 presents the PMC number to performance monitor 50, which, as illustrated at block 202, determines whether it is operating in multithread or global mode. As depicted at block 204, in response to a determination that performance monitor 50 is operating in global mode, performance monitor 50 outputs the value of the specified PMC to a specified one of integer registers 38 if the access is a read. If the access is a write, performance monitor 50 writes the specified data value into the specified PMC.

Referring again to block 202, in response to a determination that performance monitor 50 is operating in multithread mode, the process proceeds to block 206. Block 206 illustrates a determination of whether thread 0 or thread 1 is the active thread. If thread 1 is the active thread, the specified PMC address, which has a valid range of 1–4, is mapped to a respective one of PMC5–PMC8, as illustrated at block 208. Alternatively, if thread 0 is the active thread, the specified PMC address is utilized to access a corresponding one of PMC1–PMC4, as depicted at block 210. As illustrated in FIG. 3, this PMC address mapping is implemented by addressing logic 90.

As has been described, the present invention provides a multithreaded processor including a performance monitor that can individually monitor the performance of multiple concurrent threads when operating in a first mode. In addition, the performance monitor can be configured by software to operate in a second mode in which all event occurrences generated by the processor are monitored collectively. According to an important aspect of the present invention, the performance monitor can be configured to monitor events generated by thread switches, thereby permitting measurement of the performance benefits of multithreaded operation and the optimization of multithreaded software and hardware.

While the invention has been particularly shown and described with reference to a preferred embodiment, it will be understood by those skilled in the art that various changes in form and detail may be made therein without departing from the spirit and scope of the invention.

What is claimed is:

1. A multithreaded processor, comprising:
execution circuitry that executes instructions in an active thread among first and second concurrent threads;
buffering circuitry that buffers at least one of instructions and data of an inactive thread among said first and second concurrent threads;
thread switch logic that switches threads by activating said inactive thread and inactivating said active thread; and
a performance monitor that records a number of occurrences of an event generated by thread switches.

2. The multithreaded processor of claim 1, wherein said execution circuitry, said buffering circuitry, said thread switch logic, and said performance monitor are all formed within a single semiconductor substrate.

3. The multithreaded processor of claim 1, said multithreaded processor generating occurrences of a plurality of diverse events in response to said first and second threads, wherein said performance monitor includes a control that selectively determines a subset of said plurality of diverse events for which occurrences are recorded.

4. The multithreaded processor of claim 1, wherein said performance monitor records a number of thread switches.

5. The multithreaded processor of claim 1, wherein said performance monitor records a number of thread switches that were triggered by at least one specified event within said multithreaded processor.

6. The multithreaded processor of claim 1, wherein said performance monitor records a number of thread switches of only said first thread.

7. The multithreaded processor of claim 1, wherein said performance monitor records a number of thread switches occurring after less than a predetermined number of instructions have been executed since a last thread switch.

8. The multithreaded processor of claim 1, wherein said performance monitor records a number of cycles that elapse while said inactive thread switches to become said active thread.

9. The multithreaded processor of claim 1, said multithreaded processor including a cache, wherein said performance monitor records a number of thread switches following which an instruction must be fetched from said cache before execution of said active thread begins.

10. The multithreaded processor of claim 1, wherein said performance monitor records a number of cycles that said inactive thread is capable of being executed prior to a thread switch.

11. The multithreaded processor of claim 3, wherein said performance monitor records a number of processor cycles that both said active thread and said inactive thread are being utilized by software executing within said multithreaded processor.

12. The multithreaded processor of claim 3, wherein said performance monitor records a number of processor cycles that said multithreaded processor operates in single-thread mode.

13. A method of operating a multithreaded processor, said method comprising:

executing instructions in an active thread among first and second concurrent threads;

buffering at least one of instructions and data of an inactive thread among said first and second concurrent threads;

switching threads by activating said inactive thread and inactivating said active thread; and recording an occurrence of an event generated by switching threads.

14. The method of claim 13, said multithreaded processor generating occurrences of a plurality of diverse events in response to said first and second threads, said method further comprising the step of selecting a subset of said plurality of diverse events for which occurrences are recorded.

15. The method of claim 13, said recording step comprising the step of recording each thread switch.

16. The method of claim 13, said recording step comprising the step of recording only those thread switches that are triggered by at least one specified event within said data processing system.

17. The method of claim 13, said recording step comprising the step of recording thread switches of only said first thread.

18. The method of claim 13, said recording step comprising the step of recording thread switches occurring after less than a predetermined number of instructions have been executed since a last thread switch.

19. The method of claim 13, said recording step comprising the step of recording a number of cycles that elapse while said inactive thread switches to become said active thread.

20. The method of claim 13, said multithreaded processor including a cache, wherein said recording step comprises the step of recording a number of thread switches following which an instruction must be fetched from said cache before execution of said active thread begins.

21. The method of claim 13, said recording step comprises the step of recording a number of cycles that said inactive thread is capable of being executed prior to a thread switch.

22. The method of claim 13, and further comprising the step of recording a number of processor cycles that both said active thread and said inactive thread are being utilized by software executing within said multithreaded processor.

23. The method of claim 13, and further comprising the step of recording a number of processor cycles that said multithreaded processor operates in single-thread mode.

* * * * *